May 7, 1968
F. SCHAEDLICH ETAL
3,381,335
PORTABLE POWER DRIVEN SERVICING APPARATUS
ESPECIALLY FOR AUTOMOTIVE VEHICLES
Filed Jan. 17, 1966
2 Sheets-Sheet 1
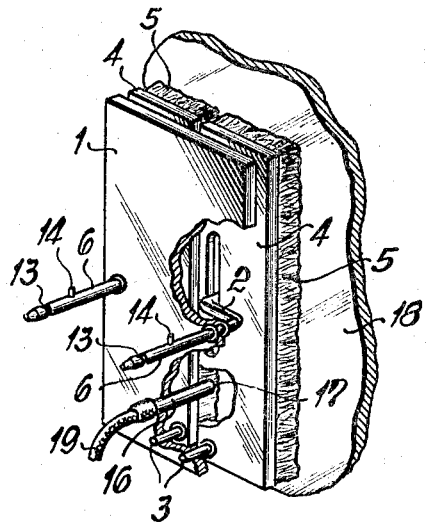
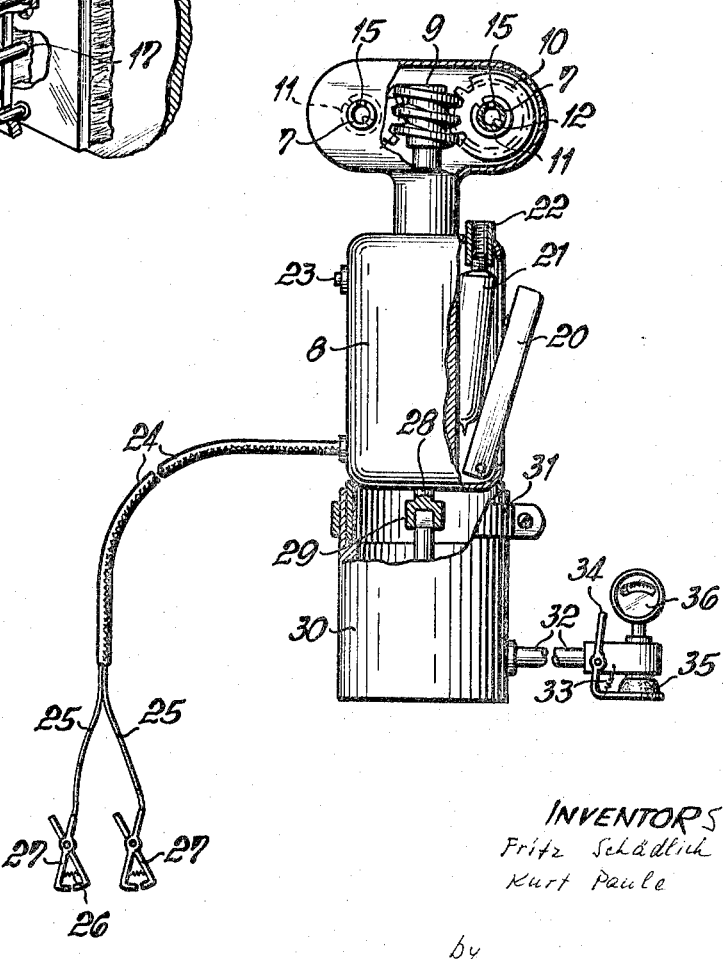
INVENTORS
Fritz Schädlich
Kurt Paule
by
Michael S. Striker

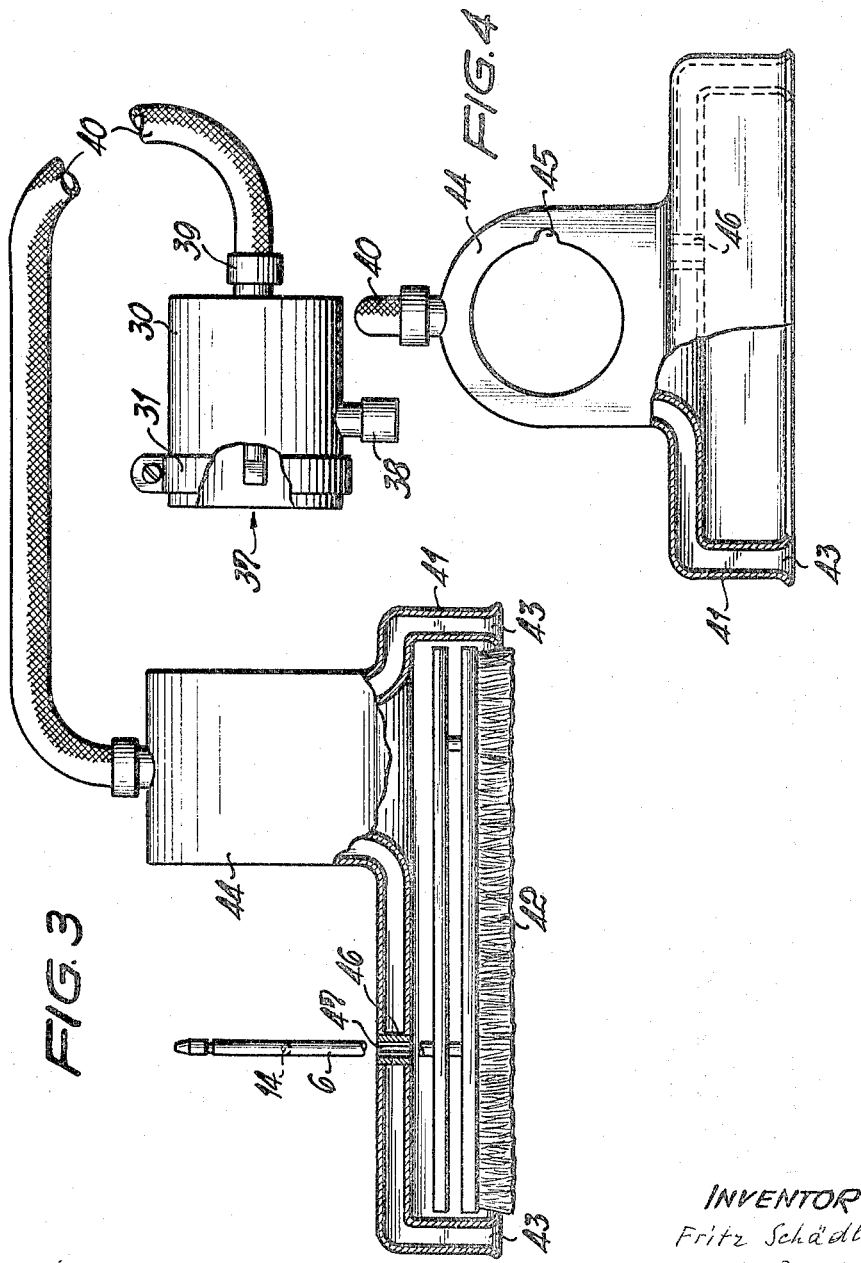

United States Patent Office 3,381,335
Patented May 7, 1968

3,381,335
PORTABLE POWER DRIVEN SERVICING
APPARATUS ESPECIALLY FOR AUTO-
MOTIVE VEHICLES
Fritz Schaedlich, Echterdingen, and Kurt Paule, Stuttgart-Oberturkheim, Germany, assignors to Robert Bosch, G.m.b.H., Stuttgart, Germany
Filed Jan. 17, 1966, Ser. No. 520,940
Claims priority, application Germany, Jan. 23, 1965, B 80,240
17 Claims. (Cl. 15—313)

ABSTRACT OF THE DISCLOSURE

A portable power driven apparatus for servicing motor vehicles in which an implement including a pair of brushing and polishing means are by means of a gearing and first coupling means removably attached to the drive shaft of a motor of the apparatus and in which a pair of additional implements such as vacuum cleaning means and an air pump for replenishing the air in the tires of the motor vehicle may be selectively attached to second coupling means provided on the drive shaft so that the power driven apparatus may be changed from one to another mode of operation.

---

The present invention relates to a portable power driven servicing apparatus, especially suitable for servicing, for instance cleaning and polishing, of an article, especially an automotive vehicle.

Apparatus of this kind are known in the art in which a pair of brushes or the like are pivotably mounted on a mounting plate for oscillating motion toward and away from each other and in which the brushes are driven by a motor to carry out the oscillating motion. Apparatus of this type known in the art are constructed to carry out only brushing and polishing operations and have therefore only a limited application.

It is an object of the present invention to provide a portable power driven servicing apparatus, especially for automobiles, which may serve not only for brushing and polishing of a surface, for instance the body of an automotive vehicle, but which may also serve to carry out additional operations for instance to feed a cleaning and polishing agent onto the surface to be cleaned or polished, to vacuum clean the seats and other parts of the vehicle and to check, respectively replenish the air in the vehicle tires.

It is an additional object of the present invention to provide for a portable power driven servicing apparatus of the aforementioned kind which can quickly and easily be changed from one mode of operation to another one.

It is a further object of the present invention to provide for a portable power driven servicing apparatus of the aforementioned kind which is constructed of relatively few and simple parts so that the apparatus may be produced at reasonable cost and will stand up trouble-free under extended use.

With these objects in view, the power driven portable servicing apparatus according to the present invention mainly includes support means, a motor mounted on the support means and having a drive shaft, a pair of driven shaft means rotatably mounted on the support means and extending transverse to the drive shaft, transmission means for transmitting a drive from one end of the drive shaft to the pair of driven shaft means. A first coupling means is provided at the free end of each of the pair of driven shaft means and second coupling means are provided at the other end of the drive shaft, whereby a plurality of implements for servicing and cleaning automotive vehicles or the like may be selectively attached to said first and second coupling means so that the power driven apparatus may be changed from one to another mode of operation.

The implement to be attached to the pair of said first coupling means at the free ends of the pair of driven shaft means is preferably in the form of means for carrying out a brushing or polishing operation, which preferably include a mounting plate and a pair of carrying plates respectively carrying brushes or polishing pads. Each of the carrying plates is pivotally connected in the region of one end thereof to the mounting plate and formed intermediate the ends thereof with an elongated slot. This arrangement includes also a pair of cranks turnably mounted on the mounting plate, each having one end slidably engaged in the slot of the respective carrying plate and each adapted to be removably connected at the other end thereof to a respective one of the pair of first coupling means. The mounting plate forms with the aforementioned components mounted thereon a single unit which can be attached and removed as a unit to the first coupling means. Preferably the mounting plate carries also a sleeve member extending into the space between the two carrying plates of the brushes and having an open end directed to the surface to be cleaned, and this sleeve member communicates with a compressible container mounted on the support means and adapted to be filled with a polishing and cleaning agent so that the latter may be fed through the sleeve onto the surface to be cleaned during compression of the container.

A vacuum cleaner or an air pump may be selectively attached to the second coupling means to be driven by the motor.

In this way the apparatus may be used for brushing and polishing a surface, for instance a body of the motor vehicle with only the brush means attached to the first coupling means and during a polishing or cleaning operation a cleaning or polishing agent may be fed into the space between the oscillating brushes onto the surface to be cleaned. On the other hand, the vacuum cleaner may be attached to the second coupling means and this vacuum cleaner may be used in combination with the brushes to thoroughly clean for instance the seats of a motor vehicle or other parts thereof. The brushes and the vacuum cleaner may also be removed from the apparatus and the air pump may be connected to the second coupling means so that the air pump may be used for replenishing air in the tires. A pressure gauge is preferably combined with the air pump so that the pressure in the tires may be checked at the same time.

In this way he servicing apparatus of the present invention may be quickly changed from one to another mode of operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective partially sectioned view of a unit formed by a mounting plate, a pair of carrying plates for a pair of brushes and a pair of cranks turnably mounted on the carrying plate to oscillate the brushes, which unit may be attached by means of the first coupling means to the remainder of the apparatus to be driven by the motor carried thereby;

FIG. 2 is a partially sectioned front view of the motor of the apparatus and the first and second coupling means connected to the motor and FIG. 2 shows an air pump connected to the second coupling means to be driven thereby;

FIG. 3 is a partially sectioned side view of a vacuum cleaner to be attachable to the second coupling means of the motor instead of the air pump; and FIG. 4 is a partially sectioned front view of the vacuum cleaner.

Referring now to the drawings, and more specifically to FIGS. 1 and 2 of the same, it will be seen that the power driven servicing apparatus according to the present invention mainly comprises a motor 8 having a drive shaft 28 projecting to opposite sides of the motor 8, only schematically shown in FIG. 2. The housing of the motor 8 is extended and rotatably carries on the upper end thereof a pair of driven shaft means in the form of tubular shafts 7. The pair of driven shaft means 7 are arranged spaced from each other on opposite sides of the drive shaft 28 extending substantially normal to the latter. Transmission means are provided for transmitting a drive from the drive shaft 28 to the pair of driven shaft means 7, and the transmission means preferably include a worm 9 fixed to one end of the drive shaft 28 and a pair of worm gears 10 respectively fixed to the pair of driven shaft means 7 and meshing with the worm 9. A pair of first coupling means are provided on the free ends of the driven shaft means 7 and each of the first coupling means includes a longitudinally extending slot 15 provided in each tubular shaft 7, and a pin 12 fixed at its outer end to a split spring ring 11 surrounding the respective tubular shaft 7. The pin 12 slidingly extends through an appropriate bore in the tubular shaft 7 and projects with the inner end in the interior of the latter.

Means for carrying out brushing or polishing operations are removably attachable to the first coupling means and the aforementioned means preferably include, as shown in FIG. 1, a mounting plate 1 to one side of which a pair of carrying plates 4 are removably attached spaced from each other by means of a pair of pivot pins 3. The carrying plates 4 carry on the sides thereof facing away from the mounting plate 1, means 5 for carrying out a brushing or polishing operation and these means may be constituted by brushes, polishing pads or the like. The carrying plates 4 are formed intermediate the ends thereof with elongated slots extending longitudinally of the substantially rectangular carrying plates 4. The mounting plate 1 carries also a pair of cranks 2 which respectively engage with one of the ends thereof into the slots of the respective carrying plate 4, while the crank pins 6 project beyond the surface of the mounting plate 1 facing away from the carrying plates 4. Each crank pin 6 is provided adjacent the free end thereof with an annular groove 13 and rearwardly of the annular groove with a pin 14 projecting in radial direction from the crank pin 6. The mounting plate 1 and the above described components carried thereby form one unit which is attachable as one unit to the driven shafts 7 of the apparatus by inserting the crank pins 6 into the tubular shafts 7 with the transverse pins 14 on the crank pins 6 respectively located in the longitudinal slots 14 of the tubular shafts 7 and with the spring pressed pins 12 of the first coupling means located in the annular grooves 13 provided on the free ends of the crank pins 6. In this way the unit illustrated in FIG. 1 may be easily attached to the pair of first coupling means to be driven by the motor 8 and also easily removed as a unit from the remainder of the apparatus.

When the unit shown in FIG. 1 is attached by means of the first coupling means to the pair of driven shafts 7 and the motor 8 is started, the means 5 for brushing and polishing will be oscillated about the pivot pins 3 toward and away from each other to thereby clean or polish a surface 18 engaged by the means 5.

According to a further development of the apparatus of the present invention, the mounting plate 1 preferably carries also fixedly connected thereto a short rigid sleeve 16 extending through the space between the facing edges of the carrying plates 4 and having an open end 17 directed toward the surface 18 to be cleaned. During a cleaning operation the sleeve 16 may be connected by means of a flexible conduit 19 to a water conduit, not shown in the drawing, whereas during a polishing operation the sleeve 16 may be connected through the flexible conduit to a compressible container 21 filled with a cleaning or polishing agent and removably carried in a pocket formed by the housing of the motor 8. The container 21 is compressible by means of a lever 20 pivotally mounted at one end thereof in the aforementioned housing and engaging the container 21 so that the latter is compressed when the lever 20 is swung inwardly by the operator. The outward end of the container 21 may be provided, as shown in FIG. 2, with a threaded sleeve 22 to which a correspondingly formed end of the flexible conduit 19 may be threadingly attached.

The motor 8 is preferably constructed to be operable with a voltage of 12 volts, that is with the usual voltage of batteries of motor vehicles and a switch 23 serves for starting and stopping the motor 8. The connecting cable 24 for the motor 8 is preferably provided at the connecting ends 25 thereof with a pair of pivotally connected clamping jaws 27 movable between an inactive open position and an active position adapted to be clamped on the poles of the battery and biasing means in the form of springs 26 are provided which are biased to yieldably maintain the clamping jaws 27 in the active position thereof. In this way the motor 8 may be quickly connected to a battery of a motor vehicle, not shown in the drawing.

As illustrated in FIG. 2 the second coupling means 29 fixed to the other end of the drive shaft 28 of the motor may be used to attach an additional implement for servicing an automotive vehicle. As shown in FIG. 2, an air pump 30 is attached by the second coupling means 29 to the drive shaft 28 of the motor to be driven thereby. Preferably, the air pump 30 is connected to the motor 8 not only by the second coupling means 29, but an upper axially slotted annular housing portion of the pump, which surrounds and engages a correspondingly annular skirt projecting from one end of the housing of the motor 8 may be clamped by means of a clamping ring 31 to the skirt so that the air pump 30 may be easily attached and detached to the housing of the motor and connected to the second coupling means 29 to be driven thereby. The air pump 30 may serve to replenish the air in the tires of a motor vehicle. An air conduit 32 communicates with the outlet end of the air pump 30 and the air conduit 32 is provided at the free end thereof with a mouthpiece 35 adapted to be connected by means of a clamping lever 34, which is under the action of a spring 33, to the valve of a tire, not shown in the drawing. A pressure gauge 36 connected to the mouthpiece 35 and communicating therewith serves to check the air pressure in the tire.

The air pump 30 shown in FIG. 2 may be exchanged against a vacuum cleaner 37 illustrated in FIGS. 3 and 4 by connecting the shaft of the vacuum cleaner 37 to the second coupling means 29 of the drive shaft 28 of the motor 8 and by clamping the annular housing portion of the vacuum cleaner 37 by means of a clamping ring 31 onto the skirt of the motor housing. The vacuum cleaner illustrated in FIGS. 3 and 4 includes further a suction mouthpiece 41 which is connected through a conduit 40 with the suction end 39 of the vacuum cleaner 37. The mouthpiece 41 is bell-shaped and surrounds the unit illustrated in FIG. 1, whereby the carrying plates 4 are preferably exchanged against carrying plates carrying brushes 42. The bell-shaped mouthpiece 41 has a suction opening 43 directed towards the surface to be cleaned so that dust raised by the brushes 42 will be sucked through the openings 43 of the mouthpiece into the vacuum cleaner 37 to be blown into a dust bag, not illustrated in the drawings, and adapted to be connected to the outlet end 38 of the vacuum cleaner. The mouthpiece 41 is extended into an annular portion 44, as best shown in FIG. 4, with which the air conduit 40 communicates so that the motor 8 may be located in the interior of the annular portion 44. In order to accommodate the connecting cable 24, the annular portion 44 of the mouthpiece is formed with a depression 45 in which the cable 24 may be located so that the housing of the motor 8 may snugly engage the inner surface of the annular portion 44. The housing of the motor 8 has to be placed into the annular portion 44 in such a manner that the switch 23 remains accessible. The mouthpiece 41 is formed with a pair of bushings 46 through which the crank pins 6 extend and the bushings 46 are also provided with axial slots 47 so that the pins 14 on the crank pins 6 will not interfere with the bushings 46 when the crank pins 6 are extended therethrough.

The conduit 40 is preferably constructed in such a manner that it may serve as a handle for carrying and moving the apparatus when the vacuum cleaner 37 is attached to the second coupling means 29 and the housing of the motor 8 is extended through the annular portion 44 of the mouthpiece of the vacuum cleaner.

It will be understood that each of the elements described above, or two or more together, may also find a useful application in other types of portable power driven servicing apparatus differing from the types described above.

While the invention has been illustrated and described as embodied in a portable power driven servicing apparatus which can be quickly changed from one to another mode of operation, it is not intended to be limited to the details shown, since various modifications and structural changes may be mode without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a portable power driven servicing apparatus, especially for automotive vehicles or the like, in combination, support means; a motor mounted on said support means and having a drive shaft; a pair of driven shaft means rotatably mounted on said support means and extending transverse to said drive shaft; transmission means for transmitting a drive from one end of the drive shaft to said pair of driven shaft means, said pair of driven shaft means having each a free end; a pair of first coupling means respectively mounted at the free ends of said pair of driven shaft means; an implement including support means and a pair of driven means mounted on said support means and each being removably attached to a respective one of said pair of first coupling means so as to be driven by said pair of driven shaft means; and second coupling means at the other end of said drive shaft, whereby additional implements for servicing automotive vehicles or the like may be attached to said second coupling means so that the power driven apparatus may be changed from one to another mode of operation.

2. An apparatus as set forth in claim 1, wherein said pair of means are constructed for carrying out brushing and polishing operations.

3. An apparatus as set forth in claim 2, and including vacuum cleaning means comprising an air pump releasably connectable to said second coupling means to be driven by said drive shaft of said motor, said air pump having a suction opening, a suction mouthpiece adjacent said means for carrying out a brushing and polishing operation, and conduit means connecting said suction opening with said mouthpiece.

4. An apparatus as set forth in claim 1, and including an air pump releasably attachable to said second coupling means, said air pump having a pressure outlet end, and a connecting mouthpiece communicating with said pressure outlet end and adapted to be connected to a valve of a tire of an automotive vehicle, whereby the apparatus may be used for replenishing air in tires of an automotive vehicle.

5. An apparatus as set forth in claim 4 and including a pressure gauge communicating with said pressure outlet and of said air pump.

6. An apparatus as set forth in claim 2, and including mounting means for mounting the pair of means for carrying out brushing and polishing operations and forming a unit with the latter so that the pair of means may be mounted on and removed as a unit from said first coupling means.

7. An apparatus as set forth in claim 6, wherein said mounting means includes a mounting plate, and wherein each of said means for carrying out a brushing and polishing operation includes a carrying plate pivotally connected in the region of one end thereof to said mounting plate and formed intermediate the ends thereof with an elongated slot, a crank turnably mounted in said mounting plate and having one end slidably engaged in said slot and adapted to be removably connected at the other end thereof to a respective one of said pair of first coupling means.

8. An apparatus as set forth in claim 7, wherein said transmission means include a worm fixed to said one end of said drive shaft and a pair of worm gears respectively fixed to said pair of driven shaft means.

9. An apparatus as set forth in claim 8, wherein the carrying plates of said pair of means for carrying out brushing and polishing operations have facing edges arranged spaced from each other and including feeding means extending through the space between said edges for feeding a cleaning and polishing agent onto a surface to be cleaned and polished by the pair of means for carrying out a brushing and polishing operation.

10. An apparatus as set forth in claim 9, wherein said feeding means include a sleeve member carried by said mounting plate extending into the space between said spaced edges and having an open end directed to a surface to be cleaned.

11. An apparatus as set forth in claim 10, wherein said feeding means include further a compressible container mounted on said support means adapted to be filled with a polishing and cleaning agent and communicating with said sleeve.

12. An apparatus as set forth in claim 7, and including vacuum cleaning means comprising an air pump releasably connectable to said second coupling means to be driven by said drive shaft of said motor, a suction mouthpiece adjacent said means for carrying out a polishing and brushing operation, and conduit means connecting said suction opening with said mouthpiece.

13. An apparatus as set forth in claim 12, wherein said suction mouthpiece is substantially bell-shaped surrounding said unit formed by said mounting plate and said pair of means mounted thereon.

14. An apparatus as set forth in claim 13, wherein said bell-shaped mouthpiece has an annular extension in the interior of which the motor may be located when said vacuum cleaning means are connected to said second coupling means, said conduit means communicating with said annular extension of said mouthpiece.

15. An apparatus as set forth in claim 13, wherein said conduit means connecting said suction opening with said mouthpiece is constructed as a handle for carrying the apparatus.

16. An apparatus as set forth in claim 1, wherein said motor is constructed to be operated with a voltage corresponding to the voltage of a battery used in automotive vehicles.

17. An apparatus as set forth in claim 16, and including a pair of connecting cables each electrically and mechanically connected at one end thereof to said motor and each carrying at the other end thereof a pair of pivotally connected clamping jaws movable between an inactive open position and an active position, and resilient means connected to the clamping jaws and biased to yieldably maintain the latter in said active position.

References Cited

UNITED STATES PATENTS 1,970,674   8/1934   Seibert et al. _____ 15—314

FOREIGN PATENTS 280,118   11/1927   Great Britain.
836,084   4/1952   Germany.
113,886   2/1926   Switzerland.

ROBERT W. MICHELL, *Primary Examiner.*